United States Patent [19]
Minder

[11] Patent Number: 6,144,943
[45] Date of Patent: Nov. 7, 2000

[54] METHOD OF MANAGING CONTRACT HOUSEKEEPING SERVICES

[75] Inventor: Diane L. Minder, Richmond, Va.

[73] Assignee: Virginia Commonwealth University, Richmond, Va.

[21] Appl. No.: 08/955,103

[22] Filed: Oct. 21, 1997

[51] Int. Cl.[7] .................................................. G06F 17/60
[52] U.S. Cl. .................................. 705/11; 705/8; 705/9; 235/375; 235/376
[58] Field of Search ................................ 705/1, 7–9, 11; 235/375, 376

[56] References Cited

U.S. PATENT DOCUMENTS 5,680,305  10/1997  Apgar, IV .................................. 705/10

OTHER PUBLICATIONS

"Tired of Talking Dirty—A New Model for Contract Housekeeping Management" Diane L. Minder C.P.P.B., Apr. 8 and 9, 1997.

Scoring Criteria and Sample Grade Sheet used by the Department of General Services—date: at least as early as 1995.

*Primary Examiner*—Allen R. MacDonald
*Assistant Examiner*—Hani. M. Kazimi
*Attorney, Agent, or Firm*—Millen, White, Zelano & Branigan, P.C.

[57] ABSTRACT

The invention provides a method and apparatus including a computer system for managing contract housekeeping services so as to improve the quality and value of the housekeeping services received. The method invention comprises a series of actions in order to generate a grade representative of the quality of housekeeping services. This grade is then used to make at least one decision regarding the management of housekeeping services. The management having an impact upon the physical appearance and maintenance of a given facility.

8 Claims, 6 Drawing Sheets

Microfiche Appendix Included
(5 Microfiche, 405 Pages)

CABELL LIBRARY

7 NIGHT CLEANING  
(5 NIGHT FULL SERVICE 2 NIGHT MODIFIED)  
7 DAY POLICING OF RESTROOMS

901 PARK AVENUE  
215, 148 GROSS SQUARE FEET

ROOMS B-46, 201 THRU 214, COLLECTIONS & ARCHIVES ON THE 4TH FLOOR ARE TO BE CLEANED IN THE DAYTIME.

CUSTODIAL CONTRACTOR'S PERFORMANCE EVALUATION

INSPECTOR: _______________________  FLOOR/AREA: _______________________
DATE: ___________ TIME: __________  CONTRACTOR: _______________________

| ITEMS | SCORE, CIRCLE ONLY ONE |
|---|---|
| A. FLOORS | (0 - 18) |
|     BASEBOARDS | 0 1 2 3 4 5 |
|     CORNERS | 0 1 2 3 4 5 |
|     ELEVATOR TRACKS | 0 1 2 3 |
|     FLOOR SURFACE | 0 1 2 3 4 5 |
| B. RESTROOMS-LADIES | (0 - 20) |
|     FLOOR SURFACE | 0 1 2 3 4 |
|     BASINS/MIRRORS/SHELVES | 0 1 2 3 4 |
|     COMMODES | 0 1 2 3 4 |
|     WALLS/STALLS/PARTITIONS/SHOWERS | 0 1 2 3 4 |
|     DISPENSERS/WASTE/RECEPTICLES | 0 1 2 3 4 |
| C. WALLS/PARTITIONS/DOORS | (0 - 15) |
|     BRIGHT/POLISHED METAL DOORS/ PARTITION/FRAMES/HANDRAILS | 0 1 2 3 |
|     WALLS/PARTITION SURFACES | 0 1 2 3 |
|     DOOR SURFACES | 0 1 2 3 |
|     DOOR/PARTITION GLASS | 0 1 2 3 |
|     DOOR FRAME/TRIM SURFACES | 0 1 2 3 |
| D. FURNITURE/TRASH/TRASH RECEPTICLES/ASH TRAYS/ WINDOW SILLS/WINDOW COVERINGS/LEDGES/ EXPOSED SURFACES/HVAC OUTLETS/VENTS | (0 - 12) |
|     FURNITURE | 0 1 2 3 |
|     TRASH/TRASH RECEPTICLES | 0 1 2 3 |
|     WINDOW SILLS/COVERINGS | 0 1 2 3 |
|     LEDGES/EXPOSED SURFACES/HVAC OUTLETS/VENTS | 0 1 2 3 |
| E. RESTROOMS-MENS | (0 - 20) |
|     FLOOR SURFACE | 0 1 2 3 4 |
|     BASIN/MIRRORS/SHELVES | 0 1 2 3 4 |
|     COMMODES/URINALS | 0 1 2 3 4 |
|     WALLS/STALLS/PARTITIONS/SHOWERS | 0 1 2 3 4 |
|     DISPENSERS/WASTE RECEPTICLES | 0 1 2 3 4 |
| F. MISCELLANEOUS | (0 - 12) |
|     CUSTODIAL CLOSETS | 0 1 2 3 |
|     DRINKING FOUNTAINS | 0 1 2 3 |
|     DIRECTORY/BULLETIN/CHALKBOARDS | 0 1 2 3 |
|     LIGHT FIXTURES | 0 1 2 3 |

97 POSSIBLE POINTS (FOR EACH FLOOR)  
3/28/97 DATE REPORT PRINTED

SCORE _______________

FIG. 1

CUSTODIAL CONTRACTOR'S PERFORMANCE EVALUATION SCORING CRITERIA (THE RESTROOM SCORING CRITERIA SHOWN IS ONE CATEGORY EXTRACTED FROM THE CUSTODIAL CONTRACTOR'S PERFORMANCE EVALUATION CRITERIA)

GRADE SHEETS USED BY CONTRACT ADMINISTRATION INSPECTORS COINCIDE WITH THIS DOCUMENT.

RESTROOMS  SCORING
SCORE 0 - 20

| | |
|---|---|
| FLOOR | 0 - 4 |
| BASINS/MIRRORS/SHELVES | 0 - 4 |
| COMMODES/URINALS | 0 - 4 |
| WALLS/STALL/SHOWER/PARTITIONS | 0 - 4 |
| DISPENSERS/WASTE RECEPTACLES | 0 - 4 |

RESTROOM - FLOORS
SCORE 0 - 4

| | |
|---|---|
| CLEAN AND SPRAY BUFFED, FLOOR DRAINS CLEAN/ODOR FREE. | 4 |
| CLEAN BUT NEEDS SPRAY BUFFING. | 3 |
| NOT DUST MOPPED OR DAMP MOPPED. | 2 |
| STRIPPING REQUIRED. | 1 |
| TOTALLY UNACCEPTABLE | 0 |
| NOT DUST MOPPED, DAMP MOPPED AND STRIPPING/RESEALING REQUIRED) | |

RESTROOM--BASINS/MIRRORS/SHELVES
SCORE 0 - 4

| | |
|---|---|
| ALL BASINS CLEAN, FREE OF WATER SPOTS, INSIDE AND OUTSIDE, INCLUDING PIPES, FAUCETS, ETC., AND ALL MIRRORS/SHELVES CLEAN, FREE OF STREAKS, SMEARS, WATER SPOTS, AND DUST. | 4 |
| ALL BASINS CLEAN, INSIDE AND OUTSIDE, INCLUDING PIPES, FAUCETS, ETC., MIRRORS/SHELVES CLEAN EXCEPT THAT ONE OR MORE MIRRORS/SHELVES DISPLAY STREAKS/SMEARS/ WATER SPOTS/DUST. | 3 |
| ALL BASINS/MIRRORS/SHELVES CLEAN, BUT FAUCETS AND/ OR PIPES DIRTY. | 2 |
| ONE BASIN/MIRROR/SHELF DIRTY, NO EVIDENCE THAT CLEANING WAS ATTEMPTED. | 1 |
| MORE THAN ONE BASIN/MIRROR/SHELF DIRTY, NO EVIDENCE THAT CLEANING WAS ATTEMPTED. | 0 |

RESTROOM--COMMODES/URINALS
SCORE 0 - 4

| | |
|---|---|
| ALL COMMODES/URINALS CLEAN, FREE OF WATER SPOTS, INSIDE AND OUTSIDE, INCLUDING PIPES/FLUSH VALVES, ETC. | 4 |
| ALL COMMODES/URINALS, INSIDE AND OUTSIDE PIPES/FLUSH VALVES, ETC., APPEAR TO HAVE BEEN CLEANED, BUT NOT WIPED DRY, LEAVING WATER SPOTS. | 3 |
| ALL COMMODES/URINALS CLEAN; PIPES/FLUSH VALVES, ETC., DIRTY. | 2 |

FIG. 2

| | |
|---|---|
| ONE OR MORE (BUT NOT ALL) COMMODES/URINALS DIRTY (INCLUDING WATER SPOTS). | 1 |
| ALL COMMODES/URINALS DIRTY (INCLUDING WATER SPOTS). | 0 |

RESTROOM WALLS/STALL/SHOWER PARTITIONS
<u>SCORE 0 - 4</u>

| | |
|---|---|
| ALL WALLS/STALL/SHOWER PARTITIONS CLEAN, NO RESIDUE EVIDENT, NO DUST ON TOP OF PARTITIONS. | 4 |
| ALL WALLS/STALL/SHOWER PARTITIONS CLEAN, RESIDUE FREE, BUT TOP EDGE OF PARTITIONS DUSTY. | 3 |
| WALLS/STALL/SHOWER PARTITIONS DISPLAY SOAP FILM/RESIDUE/SPOTS/ SMUDGES/WRITING. | 2 |
| ONE OR MORE (BUT NOT ALL) WALLS/STALL/SHOWER PARTITIONS REQUIRE/WASHIING. | 1 |
| ALL WALLS/STALL/SHOWER PARTITIONS REQUIRE WASHING. | 0 |

RESTROOM DISPENSERS
(TOWEL, SOAP, TOILET TISSUE, SEAT COVER)
WASTE RECEPTACLES/SANITARY NAPKIN DISPOSAL
<u>SCORE 0 - 4</u>

| | |
|---|---|
| ALL DISPENSERS WIPED CLEAN AND ADEQUATELY STOCKED FOR NEXT DAY'S BUSINESS, WASTE RECEPTACLE/SANITARY NAPKIN DISPOSAL EMPTIED, CONTAINS CLEAN LINER, AND EXTERIOR WIPED CLEAN. | 4 |
| ALL DISPENSERS WIPED CLEAN AND ADEQUATELY STOCKED FOR NEXT DAY'S BUSINESS, WASTE RECEPTACLE/SANITARY NAPKIN DISPOSAL EMPTIED, BUT CONTAINS DIRTY LINER/NO LINER, OR EXTERIOR NOT WIPED CLEAN. | 3 |
| ALL DISPENSERS WIPED CLEAN AND ADEQUATELY STOCKED FOR NEXT DAY'S BUSINESS, <u>BUT WASTE RECEPTACLE/SANITARY NAPKIN DISPOSAL NOT EMPTIED,</u> | 2 |
| ONE OR MORE DISPENSERS EMPTY/INADEQUATELY STOCKED OR NOT WIPED CLEAN/WASTE RECEPTACLES/SANITARY NAPKIN DISPOSAL EMPTIED, WIPED CLEAN. | 1 |
| ONE OR MORE DISPENSERS EMPTY/INADEQUATELY STOCKED OR NOT WIPED CLEAN AND WASTE RECEPTACLE/SANITARY NAPKIN DISPOSAL NOT EMPTIED/ WIPED CLEAN. | 0 |

MICROSOFT ACCESS

FILE  EDIT  VIEW  RECORDS  WINDOW  HELP

BUILDING CLEANING INPUT/REVIEW FORM

ADD: ACTIVITY | BUILDING SCORE CATEGORY | CONTRACTOR | GRADE SHEETS
ALTER: GRADE SHEET 1 | GRADE SHEET 2 | FLOORS TO INCLUDE | CLEAR BAD SCORE
PRINT: ALL FREQUENCY SCHEDULES | ALL SCORE | BUILDING SCORE | MULTI-SCORE | FREQUENCY SCHEDULE | GRADE SHEETS | SQ FOOTAGE

BUILDING NAME: CABELL LIBRARY

ADDRESS: 901 PARK AVENUE

SQUARE FOOTAGE: 215,148 GROSS SQUARE FEET    CONTRACTOR SOUTHEAST SERVICE CORPORATION

CLEANING SCHEDULE: 7 NIGHT CLEANING. (5 NIGHT FULL SERVICE, 2 NIGHT MODIFIED) 7 DAY POLICING OF RESTROOMS.

NUMBER OF FLOORS FOR GRADING: 5    TOTAL NUMBER OF FLOORS: 5

SPECIAL INSTRUCTIONS: ROOMS B-46, 201 THRU 214, COLLECTIONS & ARCHIVES ON THE 4TH. FLOOR ARE TO BE CLEANED IN THE DAYTIME.

| CATEGORY | ACTIVITY | FREQUENCY |
|---|---|---|
| A3- RESTROOMS | CLEAN AND SERVICE | 7 NIGHTS |
| A3- RESTROOMS | SCRUB & RECOAT FLOORS | SEMI-ANNUALLY |
| A3- RESTROOMS | SPRAY BUFF/BURNISH FLOORS | MONTHLY |
| A3- RESTROOMS | STRIP & REFINISH FLOORS | SEMI-ANNUALLY |
| C1- OFFICES/CONFERENCE ROOMS | DAMP MOP FLOORS | WEEKLY |
| C1- OFFICES/CONFERENCE ROOMS | DUST CABINETS | WEEKLY |
| C1- OFFICES/CONFERENCE ROOMS | DUST CREDENZAS | ON REQUEST |

FRONT VIEW

METHOD OF MANAGING CONTRACT HOUSEKEEPING SERVICES

This application includes a microfiche appendix which has a total of 5 microfiche and a total of 405 frames. The inventor has also prepared and delivered a seminar entitled "Tired of Talking Dirty—A New Model For Contract Housekeeping Management" to a group of university housekeeping managers, at the VAPPA Annual Meeting held on Apr. 8 and 9, 1997 at the Hotel Roanoke and Conference Center, the substance of which is incorporated herein by reference. (A copy of the paper distributed at the seminar is included with the Information Disclosure Statement filed concurrently herewith).

BACKGROUND

The invention relates to a new method and apparatus for managing housekeeping contract services. Specifically, the invention includes using a computer system to measure and improve the quality and value of housekeeping services.

The growth of contract housekeeping services has accelerated in recent years as property managers move away from having a permanent housekeeping staff to instead having outsourced, contract housekeeping services. It is important and difficult to manage these services, particularly if there is a large number of different types of buildings to be maintained. Evaluating the services is equally difficult as the different buildings require different amounts and types of attention.

The generic concept of requiring quality control over housekeeping services is well-established. Typically, this quality control includes inspecting the performance of housekeeping services, filling out an inspection form and manually maintaining these inspection form records. The inspection forms are standardized and, in practice, do not accurately address the inspection requirements for specific buildings, because each building is different. The forms are not customized for the specific requirements of each building.

The usefulness of the files being manually maintained is also questionable. Documents can be misplaced or misfiled. It is difficult to manually extract useful information from the files. Many forms allow substantial room for subjective evaluation, so it is difficult to compare evaluations performed by different people and at different buildings. Further, manual files do not allow convenient positive or negative feedback as to performance, because they are difficult to decipher and review. Finally, because information is difficult to extract from manual files, substantive reviews are infrequent. There is no incentive to do quality work if there is no feedback.

Without careful oversight and management of housekeeping services, the quality of those services can decline. This results in increased costs to obtain quality work. In addition to rising costs for housekeeping services, the declining quality of services can also be costly as the maintenance is neglected. This can result in increased future costs for remedial steps that must be taken to repair facilities broken as a result of the neglected duties.

SUMMARY OF THE INVENTION

It is an object of the present invention to provide a method and apparatus for managing contract housekeeping services by using a computer system so as to improve the quality and value of the housekeeping services. The foregoing and further and more specific objects and advantages of the disclosed invention will become readily apparent to those skilled in the art from the following description of a preferred embodiment taken in conjunction with the drawings and appended claims.

In one aspect, the invention is directed to a method for using a computer system to manage contract housekeeping services comprising a series of steps. The first step of the method includes storing in the computer system a plurality of variables describing specific housekeeping service tasks. The next step includes defining a plurality of possible performance criteria scores probative of the plurality of variables. The next step includes receiving in the computer system user input operative to select a subset of the plurality of variables which are applicable to housekeeping for a given facility and then receiving in the computer system the actual performance criteria scores for the selected subset of variables. The computer system is then used to process the actual performance criteria scores and to output a grade representative of the quality of housekeeping services. This grade is then used to make at least one decision regarding management of housekeeping services, the management having an impact upon the physical appearance and maintenance of the given facility. The grade may be used to determine compensation for specific housekeeping services. Also, the grade may be used to determine whether or not to continue contract housekeeping services with the specific provider being evaluated. In another aspect, the grade may be used to implement improvements with respect to specific housekeeping service tasks.

The invention is further directed in another aspect to a computer system for managing contract housekeeping services. The system includes a first memory means for storing a plurality of variables describing specific housekeeping service tasks. The system also includes a second memory means for storing a plurality of possible performance criteria scores probative of the plurality of variables. The system has means for receiving user input and for selecting, based on that input, a subset of the plurality of variables which are applicable to housekeeping for a given facility. A computer system further includes means for receiving actual performance criteria scores for the selected subset of variables and also means for processing the actual performance criteria scores and for outputting a total grade representative of the quality of housekeeping services.

BRIEF DESCRIPTION OF THE DRAWINGS

FIG. 1 is a sample Custodial Contractor's Performance Evaluation sheet used in connection with the disclosed invention.

FIGS. 2 and 2A are sample Custodial Contractor's Performance Evaluation Criteria sheets used in connection with the disclosed invention.

DETAILED DESCRIPTION OF A PREFERRED EMBODIMENT

The steps of the claimed method will be described in connection with a preferred embodiment. Those skilled in the art will be able to take the teachings herein and make variations or other embodiments which satisfy the same function and which fall within the scope of the claimed invention.

The first step of the method aspect of the disclosed method invention comprises storing in a computer system a plurality of variables describing specific housekeeping service tasks. A comprehensive list of different housekeeping service tasks is created to include all of the different type of tasks that may be performed. The list would include all the different tasks necessary to maintain an entire campus or series of different buildings. Possibly, the tasks would cover all the necessary service tasks for just a single building or portion thereof. For instance, a business office can be expected to have different housekeeping requirements than academic classroom buildings. FIG. 1 is a Custodial Contractor's Performance Evaluation sheet that sets forth a list of tasks to be performed in connection with maintaining a single building. As can be seen, each different type of room or area lists specific tasks. A catalog of all different types of tasks is stored in the computer system.

Figure 2A:
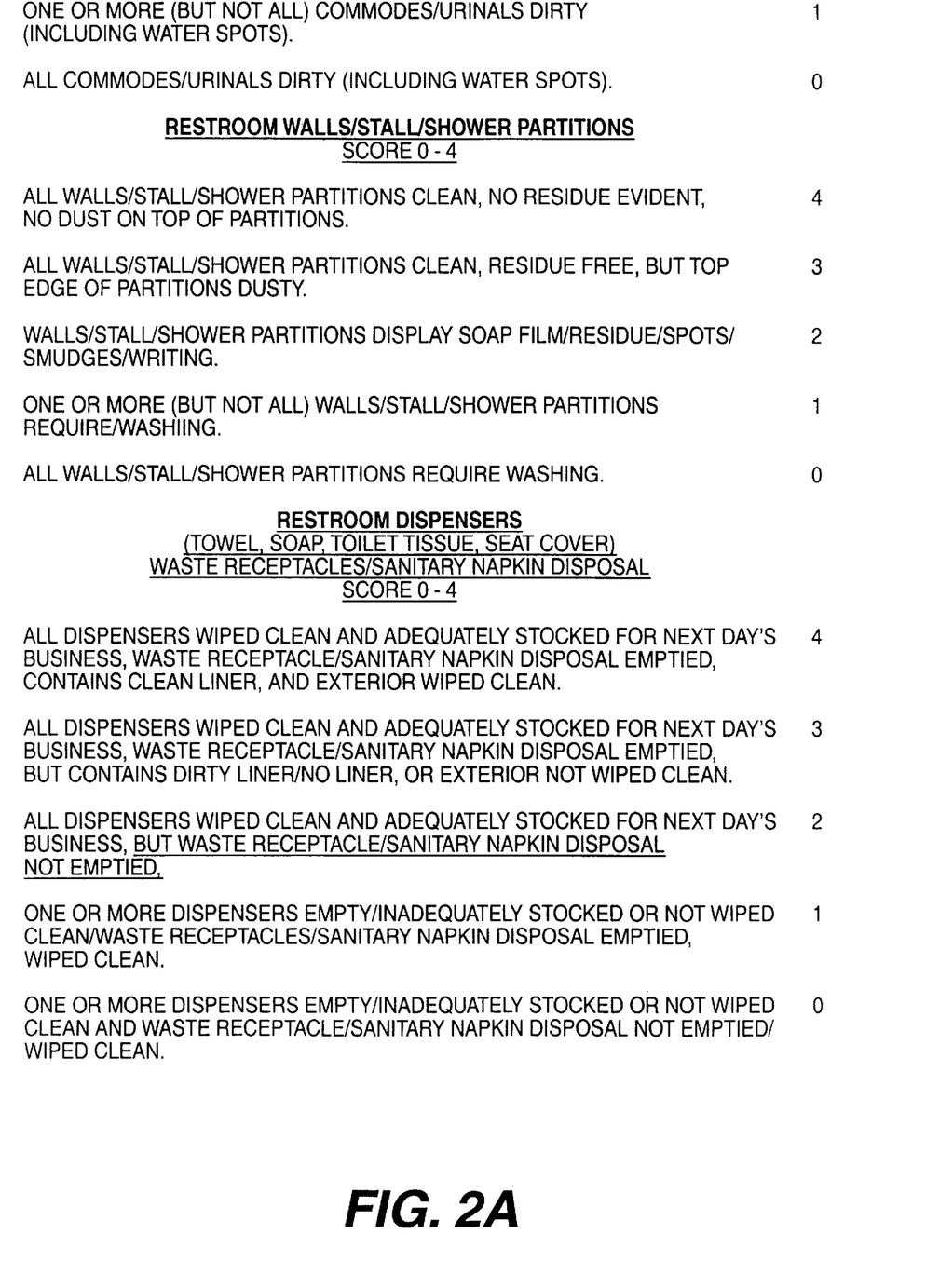

The second step comprises defining a plurality of possible performance criteria scores probative of the plurality of variables. For each of the housekeeping service tasks created above, a specific set of performance criteria scores is promulgated. A numerical score is assigned to each grade related to the quality of carrying out the given task. FIGS. 2 and 2A are a sample Custodial Contractor's Performance Evaluation Scoring Criteria that identifies performance scores in connection with specified tasks. The scores that may be awarded for each task are also listed next to the tasks shown in FIG. 1. Inspectors award scores based on the actual housekeeping performance by a contractor. The performance criteria score information may be stored in the computer system or maintained separately according to the preference and discretion of the manager.

Figure 3:
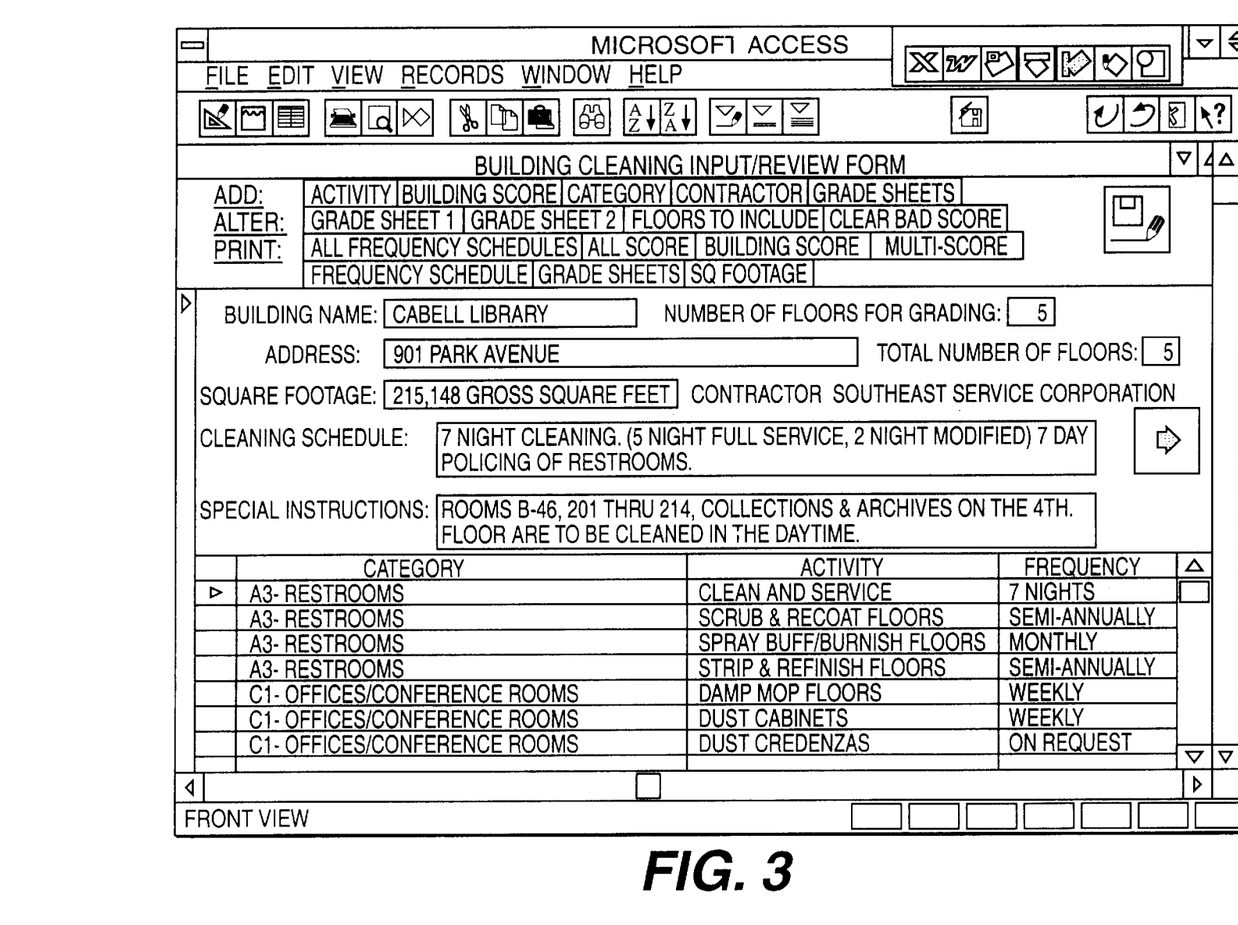
FIG. 3 is a view of a graphical "Building Input Form" screen created by the machine of the invention.

The next step comprises receiving in the computer system user input operative to select a subset of the plurality of variables which are applicable to housekeeping for a given facility. For every building or portion of buildings subject to the contract housekeeping services, the relevant subset of housekeeping tasks for that specific space is selected and input into the computer system. In this way, evaluating the quality of services for a specific space is customized to that space. This gives a fair description of services relevant to that space. Each set of tasks related to the building or space is grouped together. A computer uses this input to group the information so that it can be useful for evaluation and management purposes. FIG. 3 is a graphical "Building Input Form" screen which is an example of how specific, customized information about a building is entered into a computer by an operator.

Figure 4:
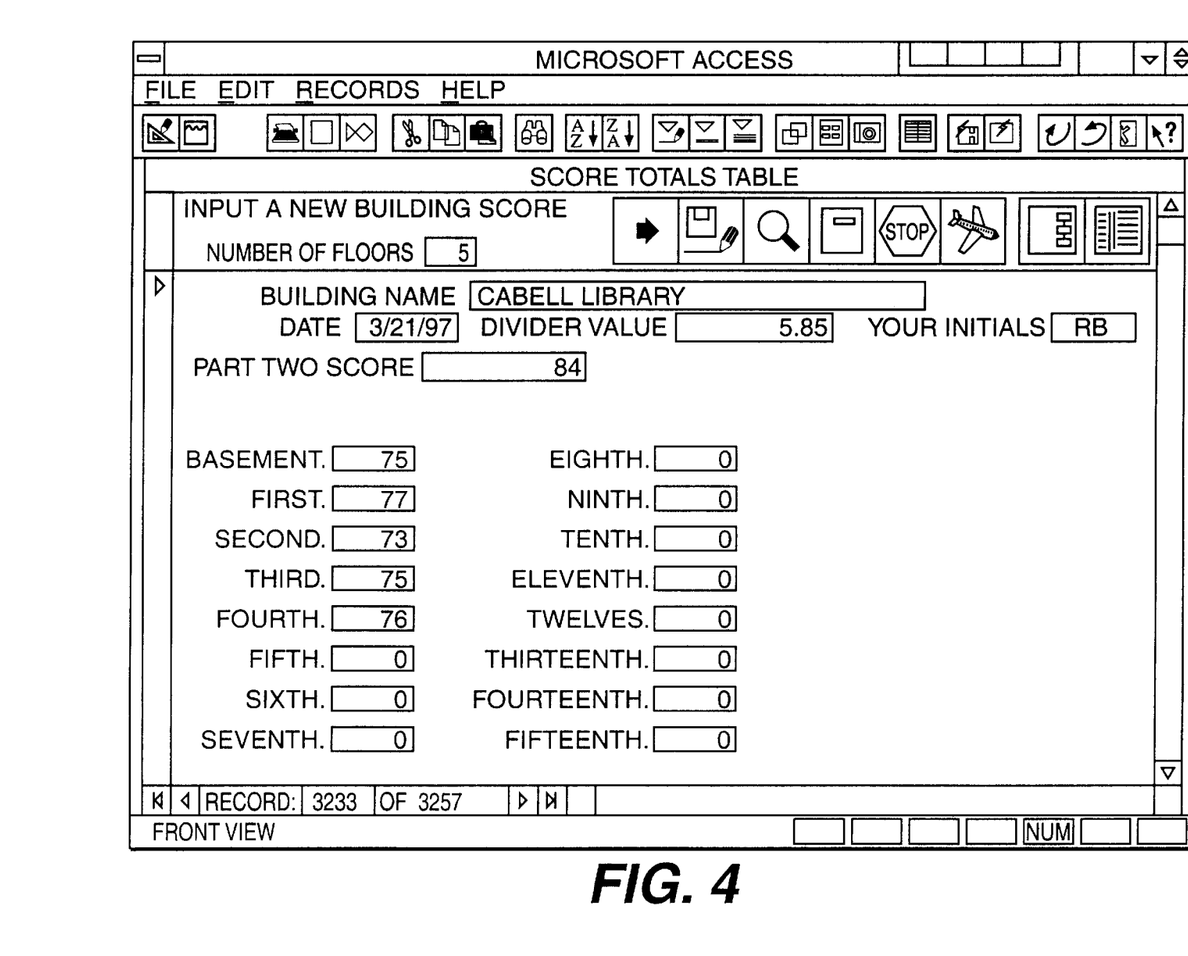
FIG. 4 is a view of a graphical "Input Building Score" screen created by the machine of the invention.

The next step comprises receiving in the computer system actual performance criteria scores for the selected subset of variables. FIG. 4 is an "Input Building Score" screen generated by the computer system. Performance criteria scores are input into the system this way based on the scores awarded by inspectors. These scores may be awarded at random times or in predetermined time increments such as daily, weekly or monthly.

The next step comprises using the computer system to process the actual performance criteria scores and to output a total grade representative of the quality of housekeeping services. The computer processes the scores to give a grade that reflects the quality or thoroughness of the services provided. This grade is given in the form of a quantative score. The score may be calculated in accordance with the preference of the manager. In a preferred embodiment of the system, a straight average of the performance criteria scores is used to calculate the grade. A weighted average is also possible. Predetermined time increments may be stored in the computer system prompting periodic inspections and/or the generation of periodic performance reports.

The next step comprises using the total grade in making at least one decision regarding management of housekeeping services. The manager has many options with respect to how he or she chooses to use the total grade. The score may be used generally as an incentive for the determination of compensation. For instance, the manager can select a specific minimum grade that is acceptable in terms of the quality of services delivered by a contract service provider. In order to receive fall compensation under a given contract, the service provider must meet minimum scores. In this situation, a minimum score is determined and compared with the score calculated by the computer system. If the score is lower than this minimum figure then there may be a reduction in contract fees due for the services provided. Alternatively, if the calculated score is higher than the minimum, then there is the option for an increase in pay or a bonus. Whether adjusting a contract fee up or down, the way in which it may be calculated can depend on the increments of score above or below the minimum acceptable score.

An example of how the performance grades may be implemented is as follows:

Performance Standards

The Contractor shall provide cleaning services at a level of ordinary tidiness in the Cabell Library.

The Contractor shall submit his or her price to maintain the building at a minimum of 75%, per the "Custodial Contractor's Performance Criteria".

An average monthly score below the minimum level of 75% service in this building, will result in price adjustments for deficiencies as set forth below.

An average monthly performance score below 60% is unacceptable performance, and may result in termination of this contract for default. An average monthly performance score below 60% for two consecutive months shall result in termination for default.

| Score | |
|---|---|
| | Monthly Payment Amount |
| 75–100% | Full Payment |
| 74–70% | 1% of the monthly contract price for every % below 75% |
| 69–65% | 1.5% of the monthly contract price for every % below 70% |
| 65–0% | 2% of the montly contract price for every % below 65% |
| | Sample Scores and Resulting Price Adjustments |
| 74% | 1% of monthly contract price |
| 70% | 5% of monthly contract price |
| 65% | 12.5% of monthly contract price |
| 60% | 22.5% of monthly contract price |
| 55% | 30.5% of monthly contract price |
| 50% | 40.5% of monthly contract price |
| 45% | 50.5% of monthly contract price |

The grade may also be used to decide whether to retain contracting services. If a score is too low with respect to the selected acceptable grade, then the contract service provider may be dismissed. If the manager uses two or more contract service providers, a high score for one service provider may be used to award future contracts or to replace unacceptable service providers. The grade may also be used as a constructive feedback to inform the contract provider as to the quality of services. The grade scores can be manipulated to give specific reports regarding performance and what particular areas of performance need improvement. The grade may even be used to monitor the inspection continuity. Lenient inspectors or harsh inspectors can be identified and, if necessary, reviewed and counseled.

The invention also includes a computer system for managing contract housekeeping services. The computer system comprises a memory means for storing a plurality of variables describing specific housekeeping service tasks and for storing a plurality of possible performance criteria scores probative of the plurality of variables. The computer system has a means for receiving user input and for selecting, based upon that input, a subset of the plurality of variables which are applicable to housekeeping for a given facility. The computer further has means for receiving user input and for selecting, based upon the input, a subset of the plurality of variables which are applicable to housekeeping for a given facility. There is also means for receiving the actual performance criteria scores for the selected subset of variables and for processing the actual performance criteria scores and outputting a total grade representative of the quality of housekeeping services.

The memory means discussed above may be separate or may together comprise a single memory. The computer system may be dedicated to processing information about a limited number of facilities. Alternatively, the system may be flexible and programmable to be adjustable to a number of different facilities. In other words, as facilities or the number of facilities increases, a different number of facilities may be incorporated in the computer system.

Figure 5:
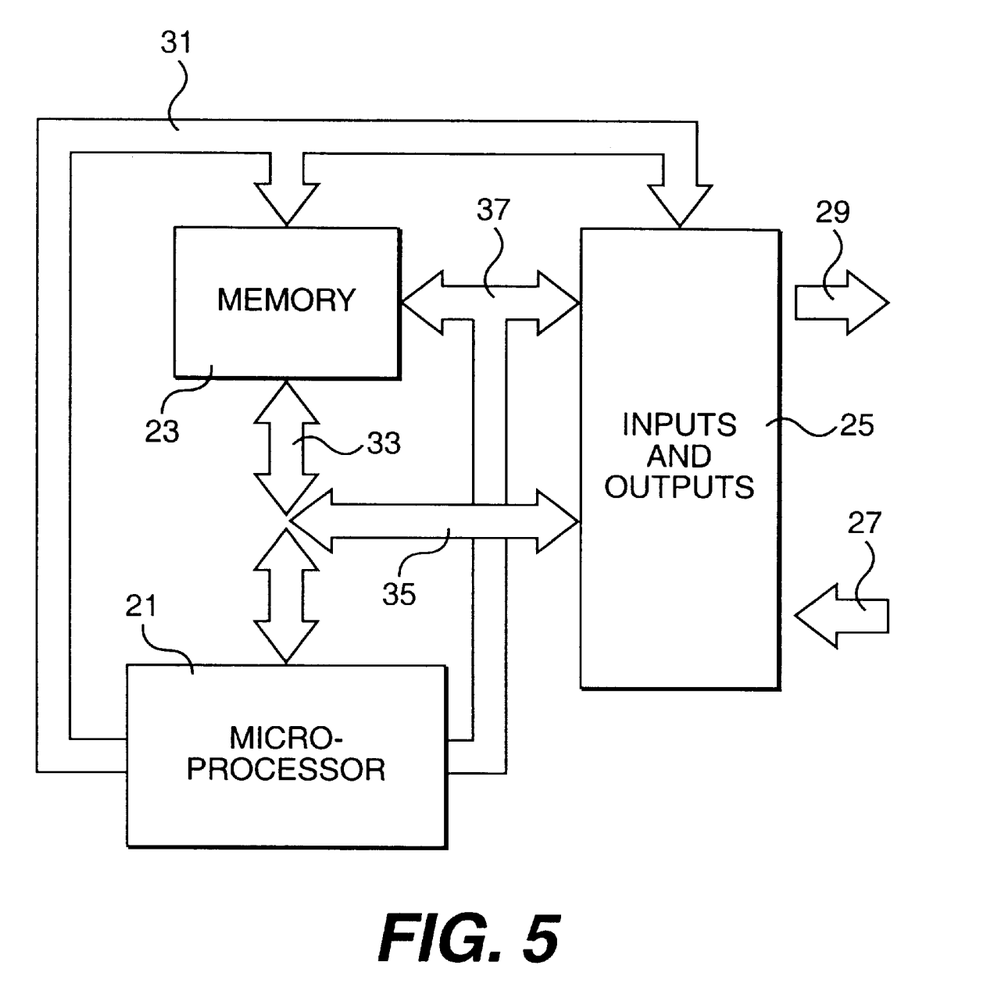
FIG. 5 illustrates a schematic block diagram of a typical computer used to implement the invention.

The invention includes a machine comprising a computer system, operating pursuant to software, that produces a series of screens for permitting a user to create, select, and display information relating to managing contract housekeeping services. As shown in FIG. 5, a microprocessor 21 receives input information 27 from I/O 25, which may comprise a keyboard, a mouse, a data storage device, a display, and other known input/output devices. Microprocessor 21 also causes output information 29, such as a graphical or textual display, to flow therefrom. Timing and control signals 37 are transferred between I/O 25 and memory 23. Instruction and data codes 33 flow between memory 23 and microprocessor 21; data codes 35 flow between I/O 25 and memory 23, as well as between I/O 25 and microprocessor 21; address codes 31 from microprocessor 21 flow to memory 23 and I/O 25.

As set forth above, the invention produces a series of graphical interactive screens which permit a user to create information relating to managing contract housekeeping services. The information regarding a plurality of variables describing specific housekeeping service tasks, and related performance criteria scores—for instance the information contained in FIGS. 1, 2 and 2A, can be input into the memory of the computer system. Screens similar to FIGS. 3 and 4 prompt the input of specific building information and performance scores. With this information and scores, the computer system processes the information to arrive at the grade that quantifies the quality of services rendered.

The microfiche appendix attached hereto illustrates source code which can be used to practice the invention. The exemplary source code is written in the MS Access database programming language and is preferably executed under the MS Windows 95 operating system running on an IBM compatible computer platform. However, other combinations of programming language, operating system and platform are possible without departing from the spirit and scope of the invention.

A preferred embodiment of the invention has been disclosed. Those skilled in the art will conceive of other embodiments satisfying the same function and which fall within the spirit and scope of the invention herein disclosed. It is intended that all such embodiments shall fall within the scope of protection provided by the claims attached hereto.

That which is claimed is:

1. A method of using a computer system to manage contract housekeeping services comprising:

storing in said computer system a plurality of variables describing specific housekeeping service tasks;

defining a plurality of possible performance criteria scores probative of the plurality of variables;

receiving in said computer system user input operative to select a subset of said plurality of variables;

receiving in said computer system actual performance criteria scores for the selected subset of variables;

using said computer system to process the actual performance criteria scores and to output a grade representative of the quality of housekeeping services;

using the grade in making at least one decision regarding management of housekeeping services, the management having an impact upon the physical appearance and maintenance of the given facility.

2. The method according to claim 1 further comprising:

using the grade to calculate compensation for the contract housekeeping.

3. The method according to claim 1 further comprising:

storing in said computer system predetermined time increments; and inputting the actual performance criteria scores into said computer system at the predetermined time increments to generate periodic performance reports.

4. A method of using a computer system to manage contract housekeeping services comprising:

storing in said computer system a plurality of variables describing specific housekeeping service tasks;

defining a plurality of possible performance criteria scores probative of the plurality of variables;

receiving in said computer system user input operative to select a subset of said plurality of variables which are applicable to housekeeping for a given facility;

receiving in said computer system actual performance criteria scores for the selected subset of variables;

using said computer system to process the actual performance criteria scores and to output a total grade representative of the quality of housekeeping services;

selecting an acceptable grade;

comparing the total grade with the acceptable grade; and using the result of said comparison in making at least one decision regarding management of housekeeping services, the management having an impact upon the physical appearance and maintenance of the given facility.

5. The method according to claim 4 further comprising:

using the grade to calculate compensation for the contract housekeeping.

6. The method according to claim 4 further comprising:

storing in said computer system predetermined time increments; and inputting the actual performance criteria scores into said computer system at the predetermined time increments to generate periodic performance reports.

7. A computer system for managing contract housekeeping services, the computer system comprising:

first memory means for storing a plurality of variables describing specific housekeeping service tasks;

second memory means for storing a plurality of possible performance criteria scores probative of the plurality of variables;

means for receiving user input and for selecting, based upon said input, a subset of said plurality of variables which are applicable to housekeeping for a given facility;

means for receiving actual performance criteria scores for the selected subset of variables; and means for processing the actual performance criteria scores and for outputting a total grade representative of the quality of housekeeping services wherein the grade is used to make at least one decision regarding management of housekeeping services, the management having an impact upon the physical appearance and maintenance of the given facility.

8. The computer system according to claim 7, wherein said first and second memory means together comprise a single memory.

* * * * *